United States Patent
Cheng et al.

(10) Patent No.: US 8,209,462 B2
(45) Date of Patent: Jun. 26, 2012

(54) PORTABLE DATA STORAGE DEVICE

(75) Inventors: Chong Seng Cheng, Singapore (SG); Teng Pin Poo, Singapore (SG)

(73) Assignee: Trek 2000 International Ltd., Singapore (SG)

( * ) Notice: Subject to any disclaimer, the term of this patent is extended or adjusted under 35 U.S.C. 154(b) by 379 days.

(21) Appl. No.: 11/926,505

(22) Filed: Oct. 29, 2007

(65) Prior Publication Data

US 2008/0059660 A1 Mar. 6, 2008

Related U.S. Application Data

(63) Continuation of application No. 09/803,173, filed on Mar. 9, 2001.

(30) Foreign Application Priority Data

Feb. 21, 2000 (WO) .................. PCTSG0000029

(51) Int. Cl.
*G06F 12/00* (2006.01)
*G06F 13/00* (2006.01)

(52) U.S. Cl. ......... 711/103; 711/100; 711/154; 711/170

(58) Field of Classification Search .................. 711/104, 711/1, 100, 103, 154–175
See application file for complete search history.

(56) References Cited

U.S. PATENT DOCUMENTS

| | | | |
|---|---|---|---|
| 4,853,523 A | 8/1989 | Talmadge | |
| 4,946,276 A | 8/1990 | Chilcott | |
| 4,988,855 A | 1/1991 | Iijima | |
| 5,282,247 A | 1/1994 | McLean et al. | |
| 5,291,584 A | 3/1994 | Challa et al. | |
| 5,297,148 A | 3/1994 | Harari et al. | |
| 5,375,243 A | 12/1994 | Parzych et al. | |
| 5,414,425 A | 5/1995 | Whiting et al. | |
| 5,442,704 A | 8/1995 | Holtey | |
| 5,469,564 A | 11/1995 | Junya | |
| 5,485,519 A | 1/1996 | Weiss | |
| 5,490,096 A | 2/1996 | Seto | |
| 5,517,014 A | 5/1996 | Iijima | |
| 5,583,538 A | 12/1996 | Watanabe et al. | |
| 5,588,146 A | 12/1996 | Leroux | |
| 5,621,798 A | 4/1997 | Aucsmith | |
| 5,623,552 A | 4/1997 | Lane | |

(Continued)

FOREIGN PATENT DOCUMENTS

CA 2334113 10/2000

(Continued)

OTHER PUBLICATIONS

Toshiba Develops Industry's First 512 Megabit NAND Flash Memory Components; (Business Wire); HighBeam Research; Jul. 29, 1999.*

(Continued)

*Primary Examiner* — Tuan V. Thai
(74) *Attorney, Agent, or Firm* — White & Case LLP

(57) ABSTRACT

A portable data storage device (10) includes a universal serial bus (USB) coupling device (1) and an interface device (2) is coupled to the USB coupling device (1). The portable data storage device (10) also includes a memory control device (3) and a non-volatile solid-state memory device (4). The memory control device (3) is coupled between the interface device (2) and the memory device (4) to control the flow of data from the memory device (4) to the USB coupling device (1).

18 Claims, 3 Drawing Sheets

U.S. PATENT DOCUMENTS

| | | | |
|---|---|---|---|
| 5,646,646 A | 7/1997 | Inoue et al. | |
| 5,655,077 A | 8/1997 | Jones et al. | |
| 5,659,705 A | 8/1997 | McNutt et al. | |
| 5,663,901 A | 9/1997 | Wallace et al. | |
| 5,684,742 A | 11/1997 | Bublitz et al. | |
| 5,760,986 A | 6/1998 | Morehouse et al. | |
| 5,815,201 A | 9/1998 | Hashimoto | |
| 5,815,252 A | 9/1998 | Price-Francis | |
| 5,815,426 A | 9/1998 | Jigour et al. | |
| 5,826,205 A * | 10/1998 | Koelle et al. | 701/29 |
| 5,844,986 A | 12/1998 | Davis | |
| 5,850,189 A | 12/1998 | Sakanaka et al. | |
| 5,867,802 A | 2/1999 | Borza | |
| 5,872,994 A * | 2/1999 | Akiyama et al. | 712/43 |
| 5,890,016 A | 3/1999 | Tso | |
| 5,920,640 A | 7/1999 | Salatino et al. | |
| 5,928,347 A | 7/1999 | Jones | |
| 5,931,791 A | 8/1999 | Saltzstein | |
| 5,935,244 A | 8/1999 | Swamy et al. | |
| 5,938,750 A | 8/1999 | Shaberman | |
| 5,943,603 A | 8/1999 | Parulski et al. | |
| 5,949,882 A | 9/1999 | Angelo | |
| 5,956,415 A | 9/1999 | McCalley | |
| 5,966,723 A * | 10/1999 | James et al. | 711/103 |
| 5,969,750 A | 10/1999 | Hsieh et al. | |
| 5,970,251 A * | 10/1999 | Zimmermann et al. | 717/168 |
| 5,973,964 A * | 10/1999 | Tobita et al. | 365/185.33 |
| 5,978,833 A | 11/1999 | Pashley et al. | |
| 5,991,519 A * | 11/1999 | Benhammou et al. | 726/3 |
| 5,999,446 A * | 12/1999 | Harari et al. | 365/185.03 |
| 6,003,135 A | 12/1999 | Bialick et al. | |
| 6,005,613 A | 12/1999 | Endsley et al. | |
| 6,006,304 A * | 12/1999 | Mukai et al. | 711/103 |
| 6,011,486 A | 1/2000 | Casey | |
| 6,011,741 A | 1/2000 | Wallace et al. | |
| 6,012,103 A | 1/2000 | Sartore et al. | |
| 6,016,476 A | 1/2000 | Maes et al. | |
| 6,016,530 A | 1/2000 | Auclair et al. | |
| 6,016,553 A | 1/2000 | Schneider et al. | |
| 6,027,375 A | 2/2000 | Wu | |
| 6,034,621 A | 3/2000 | Kaufman | |
| 6,038,320 A * | 3/2000 | Miller | 380/44 |
| 6,038,640 A | 3/2000 | Terme | |
| 6,044,428 A | 3/2000 | Rayabhari | |
| 6,047,376 A | 4/2000 | Hosoe et al. | |
| 6,058,441 A | 5/2000 | Shu | |
| 6,061,799 A | 5/2000 | Eldridge et al. | |
| 6,067,625 A | 5/2000 | Ryu | |
| 6,087,955 A | 7/2000 | Gray | |
| 6,088,755 A | 7/2000 | Kobayashi et al. | |
| 6,088,802 A | 7/2000 | Bialick et al. | |
| 6,105,130 A | 8/2000 | Wu et al. | |
| 6,116,006 A | 9/2000 | Killen et al. | |
| 6,125,192 A | 9/2000 | Bjorn | |
| 6,131,141 A | 10/2000 | Ravid | |
| 6,145,045 A | 11/2000 | Falik et al. | |
| 6,145,046 A | 11/2000 | Jones | |
| 6,145,069 A | 11/2000 | Dye | |
| 6,148,354 A | 11/2000 | Ban et al. | |
| 6,151,069 A | 11/2000 | Dunton et al. | |
| 6,151,657 A | 11/2000 | Sun et al. | |
| 6,178,508 B1 | 1/2001 | Kaufman et al. | |
| 6,182,162 B1 | 1/2001 | Estakhri et al. | |
| 6,199,122 B1 | 3/2001 | Kobayashi | |
| 6,219,439 B1 | 4/2001 | Burger | |
| 6,286,087 B1 | 9/2001 | Ito et al. | |
| 6,300,976 B1 | 10/2001 | Fukuoka | |
| 6,304,898 B1 | 10/2001 | Shiigi | |
| 6,324,537 B1 | 11/2001 | Moran | |
| 6,330,624 B1 | 12/2001 | Cromer et al. | |
| 6,330,648 B1 | 12/2001 | Wambach et al. | |
| 6,351,093 B1 | 2/2002 | Kato et al. | |
| 6,351,810 B2 | 2/2002 | Gupta | |
| 6,361,369 B1 | 3/2002 | Kondo et al. | |
| 6,370,603 B1 | 4/2002 | Silverman et al. | |
| 6,371,376 B1 | 4/2002 | Ho et al. | |
| 6,385,667 B1 | 5/2002 | Estakhri et al. | |
| 6,385,677 B1 | 5/2002 | Yao | |
| 6,446,118 B1 | 9/2002 | Gottlieb | |
| 6,457,099 B1 | 9/2002 | Gilbert | |
| 6,477,206 B1 | 11/2002 | Chatani | |
| 6,490,163 B1 | 12/2002 | Pua et al. | |
| 6,577,337 B1 | 6/2003 | Kang | |
| 6,618,806 B1 | 9/2003 | Brown et al. | |
| 6,618,807 B1 | 9/2003 | Wang et al. | |
| 6,628,325 B1 | 9/2003 | Steinberg et al. | |
| 6,636,973 B1 | 10/2003 | Novoa et al. | |
| 6,671,808 B1 | 12/2003 | Abbott et al. | |
| 6,725,382 B1 | 4/2004 | Thompson et al. | |
| 6,732,278 B2 | 5/2004 | Baird, III et al. | |
| 6,748,541 B1 | 6/2004 | Margalit et al. | |
| 6,753,921 B1 | 6/2004 | Shimizu | |
| 6,763,182 B1 | 7/2004 | Endo et al. | |
| 6,763,399 B2 | 7/2004 | Margalit et al. | |
| 6,766,456 B1 | 7/2004 | McKeeth | |
| 6,786,417 B1 * | 9/2004 | Kondo et al. | 235/492 |
| 6,799,275 B1 | 9/2004 | Bjorn | |
| 6,829,672 B1 | 12/2004 | Deng et al. | |
| 6,845,438 B1 * | 1/2005 | Tanaka et al. | 711/206 |
| 6,848,045 B2 | 1/2005 | Long et al. | |
| 6,880,054 B2 | 4/2005 | Cheng et al. | |
| 6,970,183 B1 | 11/2005 | Monroe | |
| 6,976,075 B2 | 12/2005 | Ma | |
| 6,986,030 B2 | 1/2006 | Shmueli et al. | |
| 6,992,721 B1 | 1/2006 | Kambayashi et al. | |
| 7,036,738 B1 | 5/2006 | Vanzini et al. | |
| 7,039,759 B2 | 5/2006 | Chent et al. | |
| 7,111,324 B2 | 9/2006 | Elteto | |
| 7,272,723 B1 | 9/2007 | Abbott et al. | |
| 7,447,069 B1 * | 11/2008 | Harari et al. | 365/185.11 |
| 7,761,717 B2 * | 7/2010 | Moller et al. | 713/189 |
| 2001/0009439 A1 | 7/2001 | Hwang | |
| 2001/0016845 A1 | 8/2001 | Tribbensee | |
| 2001/0029583 A1 | 10/2001 | Palatov et al. | |
| 2001/0030827 A1 | 10/2001 | Morohashi | |
| 2001/0047441 A1 | 11/2001 | Robertson | |
| 2001/0048409 A1 | 12/2001 | Kim | |
| 2001/0052541 A1 | 12/2001 | Kang et al. | |
| 2002/0010857 A1 | 1/2002 | Karthik et al. | |
| 2002/0029343 A1 | 3/2002 | Kurita et al. | |
| 2002/0065083 A1 | 5/2002 | Patel | |
| 2002/0069237 A1 | 6/2002 | Ehara | |
| 2002/0073234 A1 | 6/2002 | Ma | |
| 2002/0106933 A1 | 8/2002 | Lee | |
| 2002/0107046 A1 | 8/2002 | Davis | |
| 2002/0116565 A1 | 8/2002 | Wang et al. | |
| 2002/0131397 A1 | 9/2002 | Patel et al. | |
| 2002/0145507 A1 | 10/2002 | Foster | |
| 2002/0147882 A1 | 10/2002 | Pua et al. | |
| 2002/0151216 A1 | 10/2002 | Wei | |
| 2002/0167546 A1 | 11/2002 | Kimbell et al. | |
| 2002/0174287 A1 | 11/2002 | Cheng | |
| 2002/0174348 A1 | 11/2002 | Ting | |
| 2002/0194414 A1 | 12/2002 | Bateman et al. | |
| 2003/0063196 A1 | 4/2003 | Palatov et al. | |
| 2003/0110371 A1 | 6/2003 | Yang et al. | |
| 2003/0122839 A1 | 7/2003 | Matraszek et al. | |
| 2003/0163634 A1 | 8/2003 | Kim | |
| 2004/0010656 A1 * | 1/2004 | Chiao et al. | 711/103 |
| 2004/0025031 A1 | 2/2004 | Ooi et al. | |
| 2004/0049589 A1 | 3/2004 | Papanikolaou et al. | |
| 2004/0098598 A1 | 5/2004 | Wolfram | |
| 2004/0179588 A1 | 9/2004 | Kuffner et al. | |
| 2004/0236980 A1 | 11/2004 | Chen | |
| 2005/0235148 A1 | 10/2005 | Scheidt et al. | |
| 2006/0161725 A1 * | 7/2006 | Lee et al. | 711/103 |
| 2006/0230202 A1 | 10/2006 | Lee | |
| 2008/0177922 A1 * | 7/2008 | Chow et al. | 710/302 |
| 2008/0276050 A1 * | 11/2008 | Hsieh et al. | 711/154 |

FOREIGN PATENT DOCUMENTS

| | | |
|---|---|---|
| CN | 1291750 A | 4/2001 |
| CN | 99117225.6 | 4/2001 |
| DE | 3706466 A | 9/1988 |
| DE | 19536206 A1 | 4/1996 |
| DE | 19645937 A1 | 5/1998 |
| DE | 19712053 A1 | 9/1998 |

| | | | | | | |
|---|---|---|---|---|---|---|
| DE | 10057697 | A1 | 5/2002 | JP | 2002-222022 A | 8/2002 |
| EP | 0152024 | B1 | 8/1985 | JP | 2002232769 A | 8/2002 |
| EP | 0703544 | A | 3/1996 | JP | 2002359763 A | 12/2002 |
| EP | 0856818 | A2 | 5/1998 | JP | 2003186782 A | 7/2003 |
| EP | 0856818 | A3 | 5/1998 | JP | 2005-167965 A | 6/2005 |
| EP | 0883083 | A1 | 9/1998 | JP | 2006-030326 A | 2/2006 |
| EP | 0883083 | | 12/1998 | KR | 19990018244 A | 3/1999 |
| EP | 0883084 | A2 | 12/1998 | KR | 99-0062951 A | 7/1999 |
| EP | 0 917 060 | A1 | 5/1999 | KR | 1999-0062951 A | 7/1999 |
| EP | 0923018 | A2 | 6/1999 | KR | 20000009757 A | 2/2000 |
| EP | 0924656 | A2 | 6/1999 | KR | 10-2000-0054614 | 9/2000 |
| EP | 0924657 | A2 | 6/1999 | KR | 20000061817 A | 10/2000 |
| EP | 0929043 | A1 | 7/1999 | KR | 20010074291 A | 4/2001 |
| EP | 0945777 | A | 9/1999 | KR | 2001-0044238 A | 6/2001 |
| EP | 1 006 479 | A2 | 6/2000 | KR | 20010067730 A | 7/2001 |
| EP | 1030494 | A1 | 8/2000 | KR | 2001-0097886 A | 11/2001 |
| EP | 1077399 | A2 | 2/2001 | KR | 20020014193 A | 2/2002 |
| EP | 1085521 | A1 | 3/2001 | KR | 2002085497 A | 11/2002 |
| EP | 1 093 048 | A2 | 4/2001 | NZ | 329369 | 10/1997 |
| EP | 1 158 763 | A2 | 4/2001 | TW | 431101 | 4/2001 |
| EP | 1100000 | A2 | 5/2001 | TW | 439377 | 6/2001 |
| EP | 1152324 | A2 | 7/2001 | TW | 446851 | 7/2001 |
| EP | 0912939 | B1 | 9/2001 | TW | 453071 | 9/2001 |
| EP | 1139224 | A2 | 10/2001 | WO | 87/07063 | 11/1987 |
| EP | 1146559 | A1 | 10/2001 | WO | 89/12287 A | 12/1989 |
| EP | 1156697 | A1 | 11/2001 | WO | 94/12938 A1 | 6/1994 |
| EP | 1215876 | A1 | 6/2002 | WO | 95/16238 A1 | 6/1995 |
| EP | 1215877 | A2 | 6/2002 | WO | 97/34252 A1 | 9/1997 |
| EP | 1215877 | A3 | 6/2002 | WO | 97/39549 A2 | 10/1997 |
| EP | 0674290 | B1 | 1/2004 | WO | 9739549 A2 | 10/1997 |
| EP | 1146559 | B1 | 3/2006 | WO | 98/07255 | 2/1998 |
| GB | 2197734 | A | 5/1988 | WO | 98/12670 | 3/1998 |
| GB | 2204971 | A | 11/1988 | WO | 98/13791 A | 4/1998 |
| GB | 2312040 | A | 10/1997 | WO | 98/38567 | 9/1998 |
| GB | 2 354 612 | A | 6/2000 | WO | 99/08238 | 2/1999 |
| GB | 2361558 | A | 10/2001 | WO | 99/13434 A1 | 3/1999 |
| JP | 64-048151 | A | 2/1989 | WO | 99/16024 A1 | 4/1999 |
| JP | 08-263631 | A | 10/1996 | WO | 99/56429 A1 | 4/1999 |
| JP | 9-69969 | A | 3/1997 | WO | 99/28701 A1 | 6/1999 |
| JP | 9069067 | | 3/1997 | WO | 99/40723 | 8/1999 |
| JP | 9-297844 | A | 11/1997 | WO | 99/45460 | 9/1999 |
| JP | 10-003532 | A | 1/1998 | WO | 99/52236 A1 | 10/1999 |
| JP | 10-269145 | A | 10/1998 | WO | 99/56236 A1 | 11/1999 |
| JP | 10-283292 | A | 10/1998 | WO | 99/60786 A1 | 11/1999 |
| JP | 11-053060 | A | 2/1999 | WO | 99/63476 | 12/1999 |
| JP | 11-143760 | A | 5/1999 | WO | 00/03316 A1 | 1/2000 |
| JP | 11-184992 | A | 7/1999 | WO | 00/07387 | 2/2000 |
| JP | 11-265324 | A | 9/1999 | WO | 00/14987 A1 | 3/2000 |
| JP | 11266384 | A | 9/1999 | WO | 00/19294 A2 | 4/2000 |
| JP | 2000048177 | | 2/2000 | WO | 00/22774 A1 | 4/2000 |
| JP | 2000-181963 | A | 6/2000 | WO | 00/28471 | 5/2000 |
| JP | 2000-207835 | A | 7/2000 | WO | 00/28539 A1 | 5/2000 |
| JP | 2000200123 | | 7/2000 | WO | 0042491 | 7/2000 |
| JP | 2000200248 | | 7/2000 | WO | 00/45696 A1 | 8/2000 |
| JP | 2000209534 | A | 7/2000 | WO | 00/48135 A1 | 8/2000 |
| JP | 2000-231558 | A | 8/2000 | WO | 00/55707 A1 | 9/2000 |
| JP | 2000-244796 | A | 8/2000 | WO | 00/60476 | 10/2000 |
| JP | 2000-331166 | A | 11/2000 | WO | 00/67098 A1 | 11/2000 |
| JP | 2000307911 | | 11/2000 | WO | 01/06786 A1 | 1/2001 |
| JP | 2000-350174 | A | 12/2000 | WO | 01/08055 A1 | 2/2001 |
| JP | 01-069260 | A | 3/2001 | WO | 01/09845 A1 | 2/2001 |
| JP | 2001-059701 | A | 3/2001 | WO | 01/15440 A1 | 3/2001 |
| JP | 2001-069390 | A | 3/2001 | WO | 01/16917 A2 | 3/2001 |
| JP | 2001-118046 | A | 4/2001 | WO | 01/22351 | 3/2001 |
| JP | 2001-128113 | A | 5/2001 | WO | 01/23987 | 4/2001 |
| JP | 2001-143052 | A | 5/2001 | WO | 01/31577 A1 | 5/2001 |
| JP | 2001-338358 | A | 7/2001 | WO | 01/33317 | 5/2001 |
| JP | 2001216099 | | 8/2001 | WO | 01/48612 A1 | 7/2001 |
| JP | 2001-249693 | A | 9/2001 | WO | 01/61692 A | 8/2001 |
| JP | 2001-249901 | A | 9/2001 | WO | 01/73570 A | 10/2001 |
| JP | 2001242965 | A | 9/2001 | WO | 01/86640 A | 11/2001 |
| JP | 2001290753 | A | 10/2001 | | | |
| JP | 2001344173 | | 12/2001 | | | |
| JP | 2001346075 | | 12/2001 | | | |
| JP | 2002-092367 | A | 3/2002 | | | |
| JP | 2002-108823 | A | 4/2002 | | | |
| JP | 2002157195 | | 5/2002 | | | |
| JP | 2002-185444 | A | 6/2002 | | | |
| JP | 02-041247 | A | 8/2002 | | | |

OTHER PUBLICATIONS

Forum Established to Promote New Super Small Memory Card; Fuji Photo Film Co., Ltd. et al; Apr. 25, 1996.*
IEEE Standard for a High Performance Serial Bus; IEEE; 1996.*
Flash memory goes mainstream; Dipert et al.; Intel Corp.; IEEE Spectrum; Oct. 1993.*

Biolog 2.0 for Windows—2000 User's Guide.

Business Wire Article, "Trek 2000 International Launches Revolutionary 'Thumb Drive' at CeBIT 2000".

computermuseum, review of desktop computers, downloaded from http://www.case.hu-berlin.de/cm/einzelAnsicht?kat=Destops &lang=eng.

IBM personal computer, model 5150, downloaded from http://oldcomputers.net/ibm5150.html.

W32.Gibe@mm, a virus discovered Mar. 4, 2002, downloaded from http://www.symantec.com/security_response/print_writeup.jsp?docid=2002-030413-4714-99.

Zero One, vol. 53, pp. 79-86, Published by Nikkei Home Publishing Company, Oct. 1, 2001.

Aladdin Knowledge Systems, Inc.; MacHUSP USB; (advertising material); pp. 29-38.

Rogers, Sue; Techlink Seminar 3 New Mac Hardware and Peripherals; Nov. 19, 1999.

Universal Serial Bus Mass Storage Class Specification Overview; V 1.0 Revision; Oct. 22, 1998.

Universal Serial Bus Mass Storage Class / UFI Command Specification; Revision 1.0; Dec. 14, 1998.

Ziller, Jason and Fair, David; Which External I/O Bus Is Right for You?; Intel Corporation; Intel Developer Update Magazine; Jan. 2000.

USBDrive Professional; www.usbdrive.com, 1998-2003.

Powerpoint presentation by M-Systems Flash Disk Pioneer Ltd.

Affidavit of Cheng Xiaohua of Netac Technology Co. Ltd., China; submitted to the High Court of the Republic of Singapore in Suit No. S672/2002/S; Jun. 3, 2003.

Statutory Declaration of Cheng Xiaohua of Netac Technology Co. Ltd., China; executed under oath in Singapore; Sep. 8, 2003.

Aladdin eToken and Rainbow iKey; Rainbow; date unknown.

Lexar JumpShot Cable; date unknown.

PCMCIA SRAM & Linear Flash Cards; C1-Tech, Simple Technology, Centennial, Intel, KingMax; date unknown; retrieved from the Internet; URL: http://www.psism.com/sram.htm; 5 pages.

Pretec PCMCIA Type I SRAM 2048 KB; date unknown; retrieved from the internet; URL: http://www.everythinglinux.com.../SRAM2M?elinux=e0c72135e544a6ea13772f5c23ba3f0; 1 page.

What is Memory Stick?; date unknown; retrieved from the internet; URL: http://www.memorystick.org/topic/eng/aboutms/feat_outline.html; 1 page.

Rajesh, Gupta; Yervant Zorian; Introducing Core-Based System Design; IEEE; 1997; pp. 15-25.

CY7C63000, CY7C63001, CY7C63100, CY7C63101, CY7C63200, CY7C63201 Universal Serial Bus Microcontroller; Cypress; Jun. 26, 1997; 27 pages.

PC/104 PCMCIA Module, 1st Edition, Part No. 2007311000 Manual; Printed in Taiwan; Jul. 1997.

IBM Smart Card Solution Elements; IBM; Jul. 1997; pp. 1-24.

Interfacing the Intel Flash 28F001BX-T to Your 186 Based System; Intel; 1998; retrieved from the internet; URL: http://developer.intel.com/design/intarch/appinots/2150.htm; 14 pages.

SY-6IEB Main Board Quick Start Guide; SOYO Computer Inc.; Sep. 1998; pp. 3-14.

Universal Serial Bus Specification Revision 1.1; Compaq, Intel, Microsoft, NEC; Sep. 23, 1998.

Week of Oct. 19, 1998; Multimedia Work; Oct. 23, 1998; retrieved from internet; URL: http://www.m2w.net/News/981019.html; 10 pages.

Understanding the Flash Translation Layer (FTL) Specification; Intel; Dec. 1998.

SanDisk ImageMate USB Review; Digital Eyes; copyright 1998-2001; retrieved from internet; URL: http://www.image-acquire.com/articles/storage/sdimagematesubs.html; 2 pages.

"JBMail" article, PC Tip Magazine, Switzerland. Dec. 2001.

Claims filed by the applicant of EP 1234305 on Oct. 10, 2006.

Decision by the EPO to refuse EP publication No. 1234305 dated Feb. 1, 2007.

Decision issued by the UK Patent Office in Application under Section 72 for revocation of patent No. GB 2371653 dated Nov. 8, 2006.

Minutes of Oral Proceedings held in EPO on Nov. 9, 2006 for EP Publication No. 1 234 305 issued on Feb. 1, 2007.

USPTO Before the Board of Patent Appeals and Interferences, Decision on Appeal, Appeal 2008-006002, U.S. Appl. No. 09/803,173, Technology Center 2100, Decided Nov. 20, 2009 Before Howard B. Blankenship, Jean R. Homere and Jay P. Lucas (Administrative Patent Judges).

USPTO Before the Board of Patent Appeals and Interferences, Decision on Request for Rehearing, Appeal 2008-006002, U.S. Appl. No. 09/803,173, Technology Center 2100, Decided May 24, 2010 Before Howard B. Blankenship, Jean R. Homere and Jay P. Lucas (Administrative Patent Judges).

Tony K.P. Wong; An Embedded Chip for USB Application; from the Architecture to Implementation; International IC '99 Conference Proceedings; Siemens; 1999; 10 pages.

AlphaPC 164LX Motherboard Product Brief; Alphaprocessor, Inc.; Jan. 1999; 2 pages.

Image Memory Card Reader SM-R1 Owners Manual; FujiFilm; Apr. 1, 1999.

SanDisk ImageMate USB CF Card Reader; Feather River Canyon News; Jul. 12, 1999; retrieved from the internet; URL: http://www.quicknet.com/~frcn/SanDiskUSB.html; 3 pages.

Jeff Keller; DCRP Review; Fujifilm MX-2900; Digital Camera Resource Page; Jul. 27, 1999; retrieved from the internet; URL: http://www.dcresource.com/reviews/fuji/mx2900-review/; 9 pages.

Matsushita Electric, Scandisk and Toshiba Agree Join Forces to Develop and Promote Next Generation Secure Memory Card; SD Card Association; Aug. 25, 1999; retrieved from the internet; URL: http://www.sdcard.org/press5.htm; 4 pages.

(BW) (CA-Rainbow-Technologies) (RNBO) Rainbow Technology Forms New Joint Venture in China; Business Wire; Nov. 8, 1999; retrieved from the internet; URL: http://www.businesswire.com/webbox/bw.110899/193120188.htm; 2 pages.

Fuji Film SM-R1 Memory Card Reader; TwoMobile; Dec. 1999; retrieved from the internet; URL: http:www.twomobile.com/rev_smr1reader.html; 3 pages.

Trek's Thumb Drive Debuts at CeBit; The Business Times; Feb. 28, 2000.

Boot sequence [online]; Jan. 16, 2001; retrieved from the internet; URL: http://web.archive.org/web/20010116104400/www.pcguide.com/ref/mbsys/bios/set/adv_Boot.htm.

T. Fukagawa & M. Nagayama; 2001 edition of Hints on Use of PC—Release of Convincing Techniques and Useful Approaches to Using PC; Touch PC; Mainichi Communications, Inc.; Mar. 24, 2001; vol. 6, No. 3, pp. 20-21.

SL11R USB Controller/16-Bit RISC Processor Data Sheet; Cypress Semiconductor Corporation; Dec. 3, 2001; 85 pages.

USB Support for Amibios8 [online]; American Megatrends; Oct. 16, 2002; retrieved from the internet; URL: http://www.ami.com/support/downloaddoc.cfm?2DLFile=support/doc/AMIBIOS8_USB_Whitepaper.pdf&FileID=513; 12 pages.

SSFDC Forum; Dec. 27, 2002; retrieved from the internet; URL: http://www.wwfdc.or.jp/english/; 1 page.

Mainboard D1307 Datasheet [online]; Fujitsu Siemens Computer, Mar. 2003; retrieved from the internet; URL: www.fujitsu-siemens.com.pl/_itemserver/dok_mainboard/datasheet_d1307.pdf; 2 pages.

Concept of SPB-Linux-2 [online]; Mar. 24, 2003; retrieved from the internet; URL: http:web.archive.org/web/20030324012428/http://www.8ung.at/spblinux/concept.htm; 3 pages.

Reference Design; SL11RIDE-Combo; Cypress; Jul. 10, 2003; retrieved from the internet; 2 pages.

Availability of Universal Serial Bus Support in Windows 95; Oct. 7, 2003; retrieved from the internet; URL: http://support.microsoft.com/default.aspx?scid=kb; en-us; 253756; 3 pages.

"Aladdin Announces eToken—Next Generation Security Key Based on Universal Bus Port" San Jose, RSA Data Security Conference, Aladdin booth # 238, Jan. 19, 1999; <Web document retrieved at http://www.aladdin.com/news/1999/etoken/etoken.asp>.

PocoMail PE v. 2.63 Web Site Publication; Web Site states released Feb. 2002, http://poco.ca/press.html.

"WIBU-Key User's Guide for Windows, DOS, OS/2 and MacOS on IBM compatible PCs and Macintosh Version 2.5" Published Jul. 1998, pp. 11-16, 25-27.

Toshiba: Press Release Sep. 26, 2000 "Toshiba Introduces 512M bit and 1G bit NAND Flash Memories," Published Sep. 26, 2000, pp. 1-2.

Toshiba: Press Release Nov. 12, 2001 "Toshiba and Sandisk Introduce a One Gigabit NAND Flash Memory Chip, Doubling Capacity of Future Flash Products," Published Nov. 12, 2001, pp. 1-3.

Grounds of Decision issued in Civil Appeals Nos. 69 and 70 of 2005 in the Court of Appeals of the Republic of Singapore, Dec. 30, 2005.

Shenzhen NETAC Technology Co., Ltd. publication "Very Small" floppy disk-Only Disk, Oct. 4, 1999.

"A Widget Makes a Bright Debut," article in "Shenzen Special Zone Daily," Oct. 9, 1999.

\* cited by examiner

PORTABLE DATA STORAGE DEVICE

The invention relates to a portable data storage device, and in particular, a portable data storage device for a computer.

Conventional data storage devices generally fall into two categories. The first category is electronic, solid-state memory devices such as read only memory (ROM) and random access memory (RAM). These memory devices are generally fitted within the computer. They are not intended to be removable or portable so that they may be used on different computers, for example, to permit the transfer of data from one computer to another computer.

The second type of device is surface based data storage devices in which data is stored, typically, on the surface of a disk or tape. Examples of surface storage devices are magnetic disks and CD ROMs. Such data storage devices require a mechanical drive mechanism to be installed in or coupled to the computer to permit the data on the storage device to be read by the computer. In addition, such memory devices are limited by the surface area of the storage device, and the combination of the storage device and the drive mechanism for reading data from the storage device is generally bulky and/or delicate due to the moving parts that are required within the drive mechanism and/or storage device.

In accordance with the present invention, there is provided a portable data storage device comprising a coupling device for coupling to a computer serial bus, an interface device coupled to the coupling device, a memory control device and a non-volatile solid-state memory device; the memory control device being coupled between the interface device and the memory device to control the flow of data from the memory device to the coupling device.

An advantage of the invention is that by providing a portable data storage device comprising a coupling device with an interface device, memory control device and a non-volatile solid-state memory device, it is possible to provide a portable data storage device which may be coupled to a computer having a serial bus port and which does not include moving parts or require a mechanical drive mechanism to read the data from the data storage device.

Preferably, the non-volatile solid-state memory device may be a read/write memory device, such as a flash memory device.

Preferably, where the memory device is a read/write memory device, the memory control device controls the flow of data to and from the memory device.

Typically, the data storage device further comprises a manually operated switch movable between a first position in which writing of data to the memory device is enabled, and a second position in which writing of data to the memory device is prevented.

Preferably, the memory control device may include a read only memory which stores a program to control the operation of the memory control device. Preferably, the memory control device is a micro-controller.

Typically, the interface device comprises a universal serial bus (USB) driver to convert data between a USB format and a PC format, and the coupling device comprises a USB coupling device.

Alternatively, the interface device comprises a driver for IEEE 1394 (Firewire) protocol, and the coupling device comprises a Firewire coupling device.

An example of a data storage device in accordance with the invention will now be described to the accompanying drawings, in which.

Figure 1:
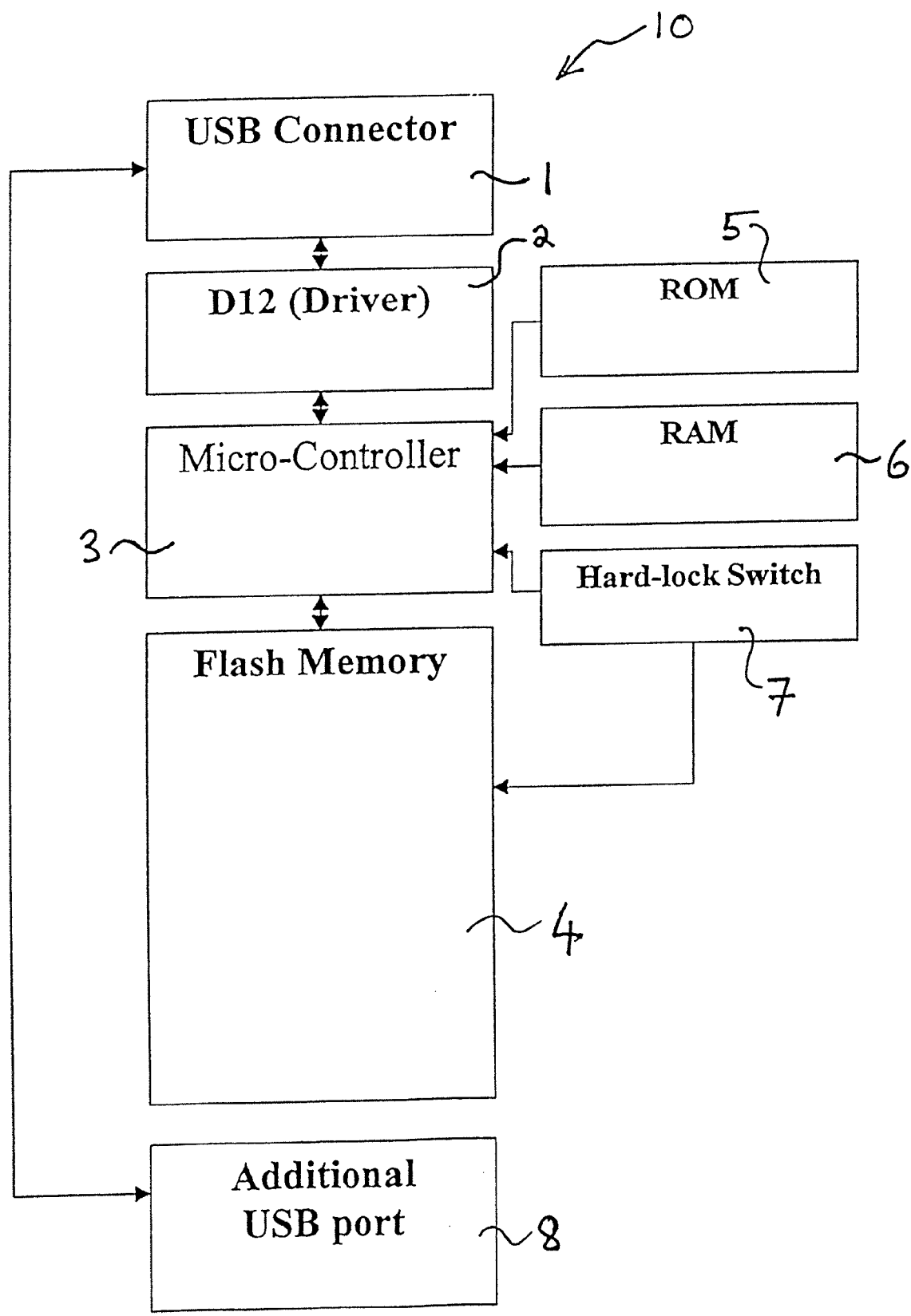
FIG. 1 is a schematic block diagram of a portable data storage device.

FIG. 1 shows a data storage device 10 which includes a USB plug 1 which is coupled to a USB interface device 2. The USB interface device 2 is coupled to a micro-controller 3 which is coupled to a flash memory 4. The micro-controller 3 includes a read only memory (ROM) 5 which stores a program to control the operation of the micro-controller 3.

The operations performed by the micro-controller 3 include comparing passwords entered by a user with a corresponding password stored in the flash memory 4 to determine whether the user is authorised to access the contents of the flash memory 4. The program stored in the ROM 5 also controls the data flow to and from the flash memory 4 and can also detect whether the computer to which the memory device 1 is coupled has installed software programs which correspond to passwords stored in the flash memory 4. The micro-controller 3 can automatically retrieve passwords from the installed software to compare with passwords stored in the flash memory to verify that a user of the computer is authorised to access and run the software. In addition, the program stored in the ROM 5 also permits the setting of a password in the flash memory by a software supplier to correspond to the password contained in software supplied to a user. Typically, the password may correspond to the serial number of the software.

The flash memory 4 is typically divided into a number of different sections or zones. Typically, the flash memory is divided into two zones and each zone has a unique password. If the data storage device 10 is supplied with packaged software, the software serial number can be set in one zone to be the password to permit a user to access and use the software. The other zone, which can be used typically for storing a user's data, may have a separate password which is set by the user. Typically, the passwords are stored in a secure location of the flash memory in an encrypted form. The encryption, decryption, data flow control and USB protocol are all managed by the micro-controller 3.

The micro-controller 3 also includes a random access memory (RAM) 6 which is a temporary storage area to permit functioning of the micro-controller 3. In addition, a manual switch 7 is coupled between the flash memory 4 and the micro-controller 3. The manual switch 7 is movable between a first position in which a user may write data to the flash memory 4 and a second position in which data is prevented from being written to the flash memory 4.

The device 10 also includes a USB socket 8 that is coupled directly to the USB plug 1 and permits other USB devices to be coupled to the USB via the device 10. For example, if a user wishes to increase memory space, a USB plug 1 of a second memory device 10 may be connected to the USB socket 8.

Figure 2:
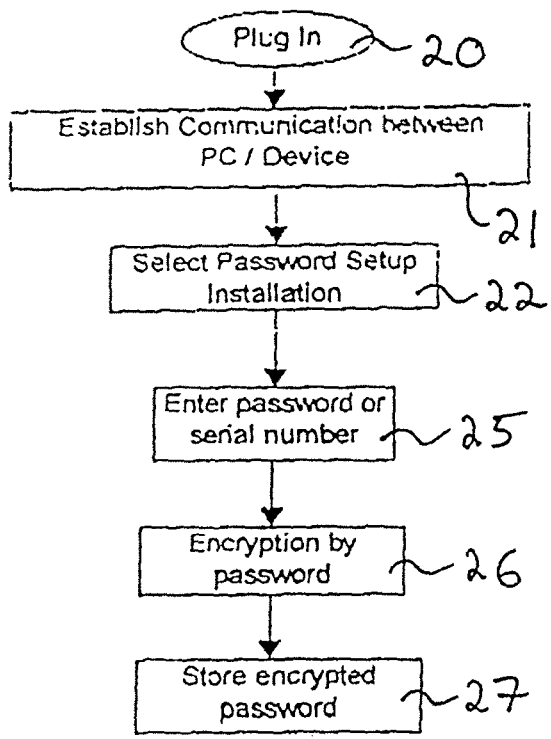
FIG. 2 is a flow diagram showing the initial setup of the data storage device by a software supplier.

FIG. 2 is a flow diagram showing the set up procedure for the device 10 for a software supplier when the software supplier intends to supply the device as an authentication device for the software. Firstly, the plug 1 of the device 10 is plugged into 20 to a USB socket on a computer. After the device 10 has been plugged into the USB socket on the computer, a communication is established 21 between the computer and the device 10. The software supplier has pre-installed installation software on the computer which is run by the operator. From the pre-installed software, the operator selects password set up installation 22, in response to which the pre-installed software requests the operator to enter a password or serial number corresponding to the software with which the device 10 is to be supplied. The password or serial number is then encrypted 26 and stored 27 in the flash memory 4.

Figure 3:
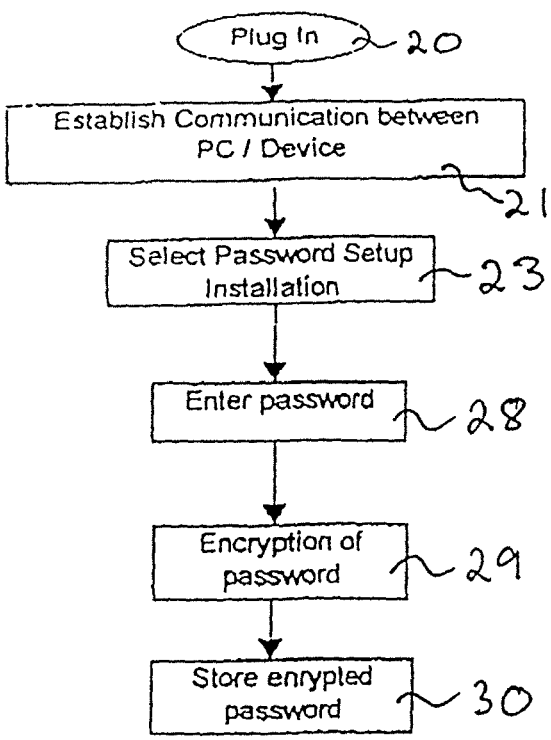
FIG. 3 is a flow diagram showing the initial setup of the data storage device by an end user.

FIG. 3 is a flow diagram showing the initial set-up of a password for zone 2 of the flash memory 4 by an end user. The device 10 is typically supplied with driver software that is loaded by the user onto the computer prior to set-up of the device. To set-up the password for zone 2 the user plugs in 20 the device 10 into a USB port on the computer and communication 21 is established between the computer and the device 10. The user then runs the driver software and the driver software enters a password installation set-up mode 23 for zone 2. The user then enters 28 a password that they wish to use to prevent unauthorised access to zone 2 of the flash memory 4. The password entered is then encrypted 29 and stored 30 in the flash memory 4.

Figure 4:
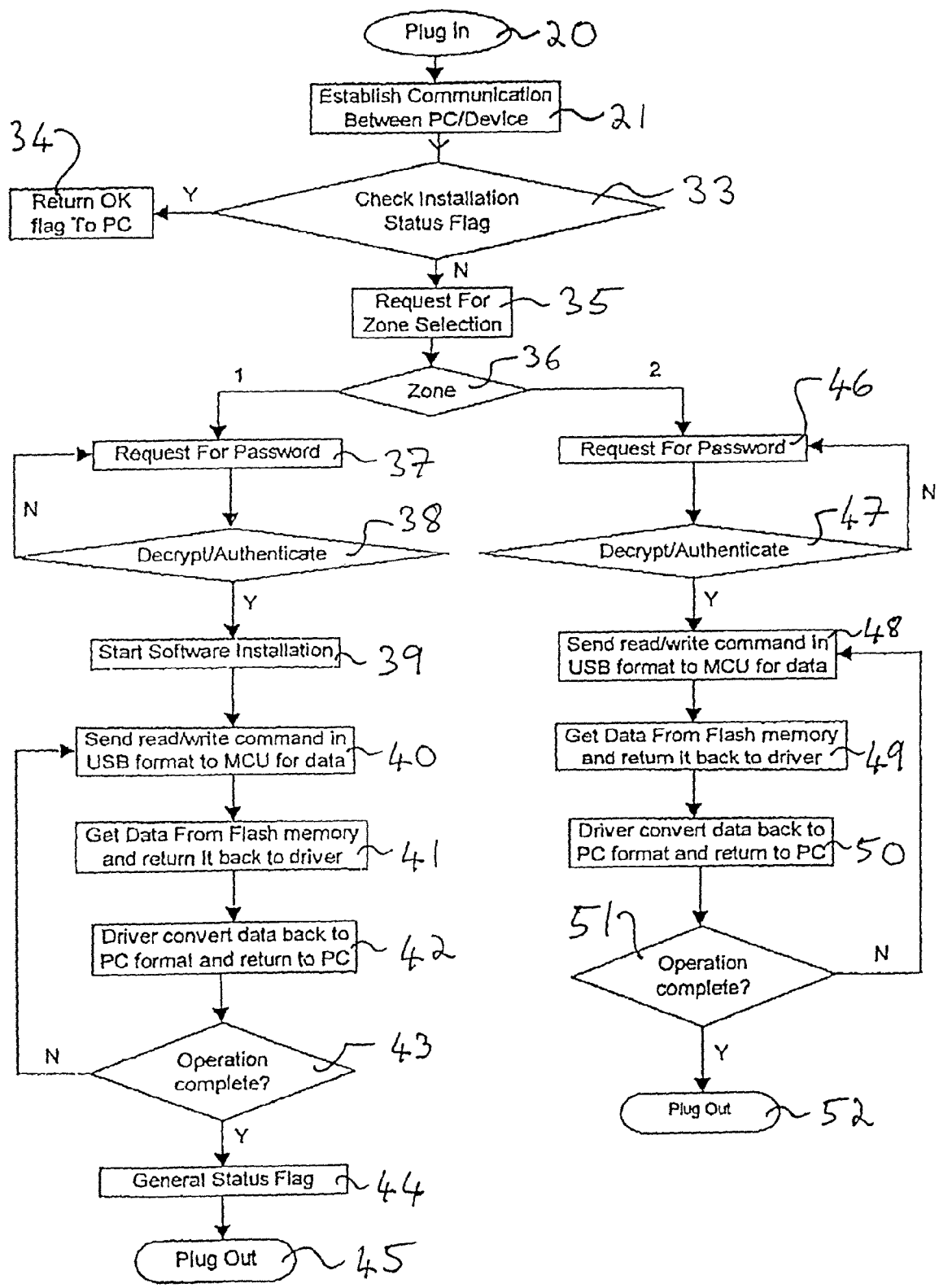
FIG. 4 is a flow diagram showing operation of the data storage device.

After an end user has performed the initial password set up procedure described above and shown in FIG. 3, when a user plugs in 20 the device 10 to a USB port on a computer, the computer will establish a communication 21 with the device 10 and firstly, checks 33 an installation status flag stored in the flash memory 4 (see FIG. 4). If the status flag is "Y", the device 10 outputs 34 an "OK" flag to the computer. The micro-controller 3 the instructs the computer to issue a request 35 to the user to select the zone they wish to enter. If the status flag is "N", the device does not output an "OK" flag to the computer, and goes straight to step 35. In response to the request 35 for zone selection, the user selects 36 either zone 1 or zone 2.

If zone 1 is selected, the device 10 assumes that the user wishes to install software on the computer which is stored in the flash memory 4 and requests 37 the appropriate password for confirmation that the user is authorised to install the software. The micro-controller 3 receives the password entered by the user, retrieves the zone 1 password stored in the flash memory 4, decrypts the zone 1 password and compares it with the password entered by the user to authenticate 38 whether the user is authorised to install the software. If the passwords do not match, the device 10 prompts the computer to request 37 the user to enter the password again.

If the password entered by the user matches the password stored in the flash memory 4, the micro-controller 3 starts 39 the software installation from the flash memory 4 to the computer. In order to install software, the computer sends 40 a read/write command in USB format to the micro-controller 3 for data, the micro-controller 3 retrieves the requested data from the flash memory 4 and sends 41 the data to the driver 2. The driver 2 converts 42 the data to PC format and outputs the data to the computer through the USB plug 1. The micro-controller 3 then checks 43 whether the software installation is complete. If the operation is not complete, the operation returns to step 40. If the installation of the software is complete, the status flag stored in the flash memory 4 is changed to "Y" and the device 10 may then be removed 45 from the USB socket on the computer.

If a user selects zone 2, the micro-controller 3 sends a command to the computer to request 46 the user to enter the password for zone 2. When the user enters the password, the computer sends the password to the micro-controller 3. The micro-controller 3 retrieves the password for zone 2 from the flash memory 4, decrypts 47 the password and compares it with the password entered by the user. If the password entered by the user is incorrect, the operation returns to step 46 and the computer requests 46 the user for the password again.

If the password entered by the user is correct, the user has access to zone 2 of the flash memory 4 to read data from the flash memory 4 and to write data to the flash memory 4. However, data can only be written to the flash memory 4 if the manual switch 7 is in the position to permit data to be written to the flash memory 4. In order to read or write data from or to the flash memory 4 a read or write command is sent 48 by the computer in USB format to the micro-controller 3. In response to the read or write command the micro-controller 3 either retrieves 49 data from the flash memory 4 and sends it to the driver 2 for conversion 50 to PC format and then to be output to the computer or receives data from the driver to write it to the flash memory 4.

The micro-controller 3 then determines 51 whether the read or write operation is complete. If the operation is not complete it returns to step 48. If the operation is complete the operation terminates 52.

The device 10 described above is for coupling to a universal serial bus (USB). However, the plug 1, the interface device 2 and socket 8 could be for use with any appropriate computer serial bus. For example, the device 10 could be modified for use with IEEE 1394 (Firewire) protocol by substituting the USB plug 1, USB interface device 2 and socket 8 with a Firewire protocol compatible plug, interface device and socket respectively.

An advantage of the device 10 described above is that it provides a portable data storage device for a computer which does not require a mechanical operated reading/writing device. In addition, the device 10 has no moving parts. This enables to data storage device 10 to be more compact than conventional portable data storage devices.

The invention claimed is:

1. A portable data storage device comprising:
 a Universal Serial Bus (USB) plug capable of being directly coupled to a USB socket of a host device without an intervening cable;
 a non-volatile solid-state memory having a memory space that is at least as much as the memory space of a magnetic disk or an optical disk; and
 a controller coupled to the non-volatile solid-state memory, the controller configured to control storage of data in the non-volatile solid-state memory, the data including at least user data that is not authorization data, the data being received from the host device via the USB plug,
 the controller further configured to divide the memory space of the non-volatile solid-state memory into a plurality of zones, wherein at least one of the plurality of zones has a first user-related attribute and at least one other of the plurality of zones has a second user-related attribute different than the first user-related attribute.

2. The portable data storage device of claim 1, wherein the controller is further configured to control retrieval of data from the non-volatile solid-state memory.

3. The portable data storage device of claim 1, wherein the controller is a micro-controller.

4. The portable data storage device of claim 1, wherein the non-volatile solid-state memory is a flash memory.

5. The portable data storage device of claim 1, wherein the non-volatile solid-state memory is configured to store a software application.

6. The portable data storage device of claim 1, wherein at least one of the plurality of zones is password-protectable.

7. A portable data storage device comprising:
 a Universal Serial Bus (USB) plug integrated into the portable data storage device without an intervening cable, the USB plug capable of being directly coupled to a USB socket of a host device;
 a non-volatile solid-state memory having a memory space that is at least as much as the memory space of a magnetic disk or an optical disk; and a controller coupled to the non-volatile solid-state memory, the controller configured to control writing of data received from the host device via the USB plug to the non-volatile solid-state memory, wherein the data includes at least user data that is not authorization data, the controller further configured to divide the memory space of the non-volatile solid-state memory into a first zone and a second zone, wherein the first zone has a first user-related attribute and the second zone has a second user-related attribute different than the first user-related attribute.

8. The portable data storage device of claim 7, wherein the controller is further configured to control retrieval of data from the non-volatile solid-state memory.

9. The portable data storage device of claim 7, wherein the controller is a micro-controller.

10. The portable data storage device of claim 7, wherein the non-volatile solid-state memory is a flash memory.

11. The portable data storage device of claim 7, wherein the non-volatile solid-state memory is configured to store a software application.

12. The portable data storage device of claim 7, wherein at least one of the first zone and the second zone is password-protectable.

13. A portable data storage device comprising:
a Universal Serial Bus (USB) plug integrated into the portable data storage device without an intervening cable such that the portable data storage device is capable of being directly coupled to a USB socket of a host device;
an interface coupled to the USB plug;
a controller coupled to the interface; and
a non-volatile solid-state memory coupled to the controller, the non-volatile solid-state memory having a memory space that is at least the same as the memory space of a magnetic disk or an optical disk;
the controller configured to control storage of data received via the USB plug from the host device in the non-volatile solid-state memory, the data including at least user data that is not authorization data,
the controller further configured to divide the memory space of the non-volatile solid-state memory into at least two zones, wherein one of the at least two zones has a user-related attribute and another of the at least two zones has a second user-related attribute different than the first user-related attribute.

14. The portable data storage device of claim 13, wherein the controller is further configured to control retrieval of data from the non-volatile solid-state memory.

15. The portable data storage device of claim 13, wherein the controller is a micro-controller.

16. The portable data storage device of claim 13, wherein the non-volatile solid-state memory is a flash memory.

17. The portable data storage device of claim 13, wherein the non-volatile solid-state memory is configured to store a software application.

18. The portable data storage device of claim 13, wherein at least one of the at least two zones is password-protectable.

* * * * *